US006757587B1

(12) United States Patent
English et al.

(10) Patent No.: US 6,757,587 B1
(45) Date of Patent: Jun. 29, 2004

(54) METHOD AND APPARATUS FOR DYNAMICALLY REPROGRAMMING REMOTE AUTONOMOUS AGENTS

(75) Inventors: James D. English, Watertown, MA (US); Chu-Yin Chang, Plano, TX (US); Bradley L. Williams, Boynton Beach, FL (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/408,056

(22) Filed: Apr. 4, 2003

(51) Int. Cl.[7] ............................................... G06F 19/00
(52) U.S. Cl. ........................ 700/245; 700/247; 700/248; 700/249; 700/253; 318/16; 318/568.12; 318/479; 701/23; 701/24; 701/28; 701/301; 414/732; 414/733; 74/828; 901/21
(58) Field of Search ................................. 700/245, 247, 700/248, 249, 253; 310/568.12, 16, 479; 701/23, 24, 28, 301; 74/828; 414/732, 733; 901/21

(56) References Cited

U.S. PATENT DOCUMENTS

| | | | |
|---|---|---|---|
| 4,527,446 A | * | 7/1985 | Borodin ........................ 74/828 |
| 5,182,506 A | | 1/1993 | Soon-Ho .................. 318/568.1 |
| 5,737,500 A | | 4/1998 | Seraji et al. ................. 700/251 |
| 5,933,828 A | | 8/1999 | Eitel et al. ...................... 707/10 |
| 6,278,902 B1 | | 8/2001 | Hashimoto et al. .......... 700/245 |
| 6,362,813 B1 | * | 3/2002 | Worn et al. ................... 345/169 |
| 6,438,456 B1 | * | 8/2002 | Feddema et al. ............ 700/245 |
| 6,445,964 B1 | * | 9/2002 | White et al. .................... 700/61 |
| 6,487,717 B1 | | 11/2002 | Brunemann et al. ......... 717/173 |
| 2003/0083673 A1 | * | 5/2003 | Tierney et al. ............... 606/130 |
| 2003/0109780 A1 | * | 6/2003 | Coste-Maniere et al. ... 600/407 |

OTHER PUBLICATIONS

Hou et al., Teleoperation characteristics and human response factor in relation to a robotic welding system, 1996, IEEE, pp. 1195–1202 vol. 3.*
World Wide Web Consortium Issues XML Schema s a W3C Recommendation, http://www.w3.org/2001/05/xml–schema–pressrelease. Published on the Internet before Apr. 4, 2003.
Improved Configuration Control for Redundant Robots, H. Seraji; Journal of Robotic Systems; 1990.
Numerical Integration and Digital–Model Updates in the AIM–9X Simulation; James D. English, James A. Bacon; Jun. 1998; Second Annual Systems Engineering Symposium; Waltham, MA.

(List continued on next page.)

Primary Examiner—William A. Cuchlinski, Jr.
Assistant Examiner—Marc McDieunel
(74) Attorney, Agent, or Firm—Ware, Fressola Van Der Sluys & Adolphson LLP

(57) ABSTRACT

An apparatus and associated method, the apparatus comprising a controlled element (10), such as a robotic manipulator, and a dynamically updatable control system (11). The control system (11) uses a control system equation (eq. (1)) to determine control signals (dq/dt) for controlling the controlled element (1) given any required inputs (q, V) to the control system equation (eq. (1)). The control system (11) is dynamically updatable in that in response to a script file indicating a code structure (11d) preferably having linked nodes (12a 13a–c) and representing at least some components (W,F,$\alpha$,$\beta$) of the control system equation (eq. (1)), the control system (11) creates the code structure (11d), at run-time, and does so such that the nodes (12a 13a–c) can be queried (i.e. are executable logic) to provide values for at least some components (W,F,$\alpha$,$\beta$) of the control system equation (eq. (1)).

23 Claims, 5 Drawing Sheets

OTHER PUBLICATIONS

An Improved Manipulator Dynamics Algorithm; James D. English, III; 1991.

"*On the Implementation of Velocity Control for Kinematically Redundant Manipulators,*" J. English and A. Maciejewski, IEEE Trans. on Sys., Man, and Cypernetics—Part A: Systems and Humans, vol. 30, No. 3, May 2000, pp. 233–237.

"*XML Enters The DBMS Arena.*" Computerworld, Oct. 30, 2000; http://www.computerworld.com/cwi/story/0.1199, NAV47_STO53026.00.html, published on the Internet before Apr. 4, 2003.

*XML Database Products* Web Site, Dec. 2000, www.rpbourret.com/xml/SMLDatabaseProds.htm, published on the Internet before Apr. 4, 2003.

* cited by examiner

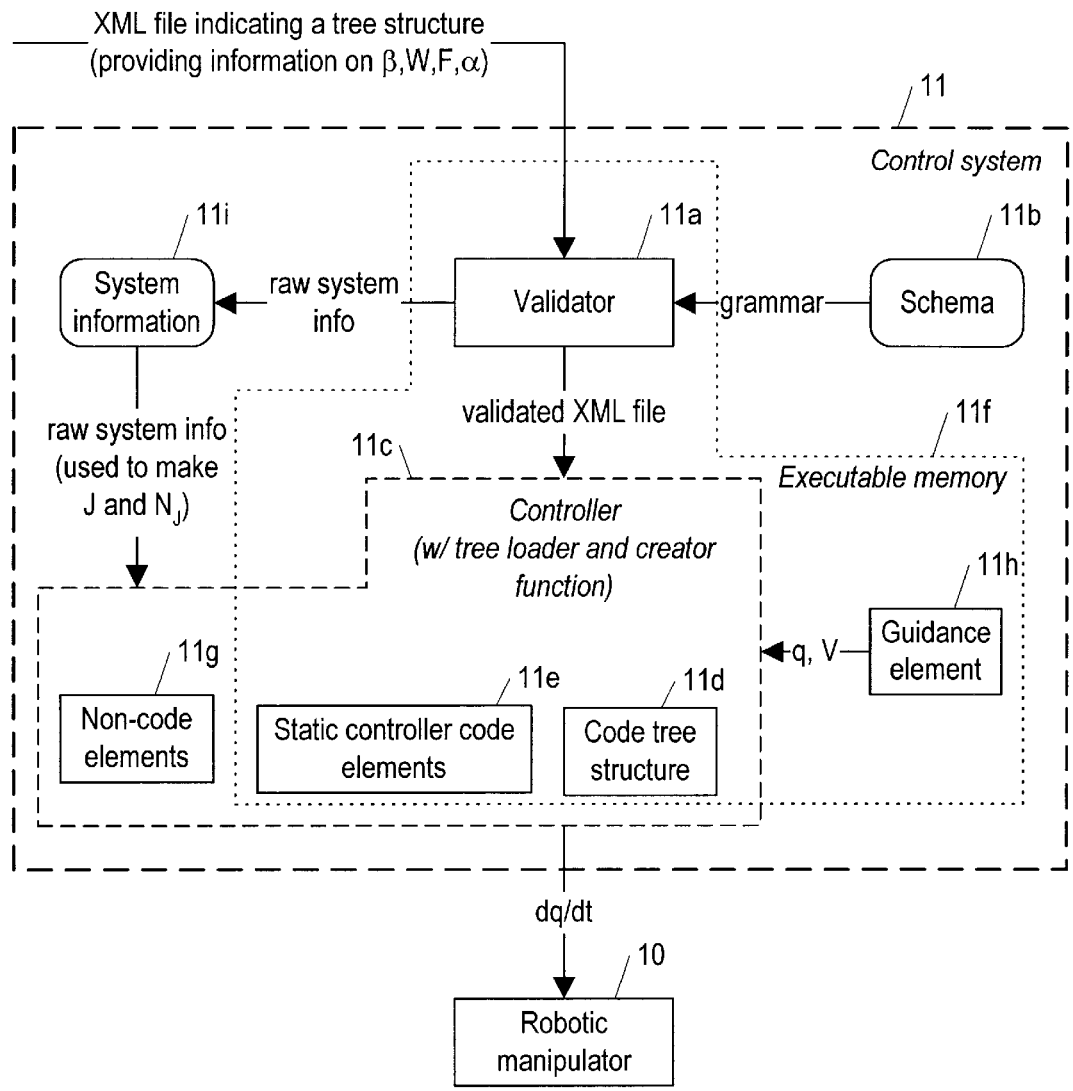
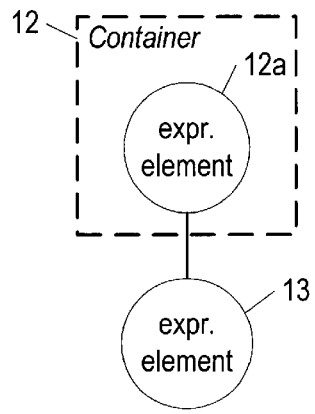
FIG. 1B
FIG. 1C

METHOD AND APPARATUS FOR DYNAMICALLY REPROGRAMMING REMOTE AUTONOMOUS AGENTS

TECHNICAL FIELD

The present invention pertains to the field of control systems for remote autonomous agents, and in particular to dynamically reprogramming control systems of remote autonomous agents, such as, e.g., dynamically reprogramming the velocity control system of a remote robotic manipulator.

BACKGROUND ART

Autonomous agents, including e.g. robotic manipulators, often act (or execute instructions) according to embedded control software implementing one or more algorithms. For example, algorithms developed for robotic manipulators (such as arms and hands) are typically implemented in embedded object code that has been precompiled and then loaded onto a computer processor residing in the manipulator. To change an existing algorithm or to add a new algorithm, the corresponding control software must be compiled and loaded into the processor, and in case of the autonomous agent already operating at a remote location, the compiled object code must first be communicated to the processor.

It is not infrequent that changes are made to fielded control systems of autonomous agents; fielded control systems are often complex, with many patches and logical paths added over the years. Even discounting innovations in the algorithms used by control systems, a control system for an autonomous agent may need to be modified on account of failure of part of the autonomous agent. For example, a joint of a robotic manipulator arm may fail, and the algorithm used for control may have to be modified so that the robotic manipulator may continue to do useful work.

In view of the inevitability of the need for changes to control systems of autonomous agents, what is needed is a way to more quickly and simply reprogram such control systems, even when the autonomous agents are remotely fielded.

DISCLOSURE OF THE INVENTION

Accordingly, in a first aspect of the invention, an apparatus is provided, comprising a controlled element and a control system, the control system using a control system equation to determine control signals and the control system then providing the control signals to the controlled element, the control system implemented so as to include executable elements operative according to coded instructions, the apparatus adapted so as to load the executable elements at power on into a memory device from which coded instructions are then obtained by which the control system is operative, the apparatus characterized in that the control system comprises: a controller, comprising static controller code elements and responsive to a script file indicating a code structure, for providing at least some components of the control system equation, the controller for creating the code structure in the memory device; wherein, in providing the code structure, the controller parses the script file so as to create the code structure in the memory device or in a memory device holding auxiliary memory, and imparts to the code structure executable logic enabling the code structure to return a set of one or more values when queried.

In accord with the first aspect of the invention, the code structure may be a code tree structure including a root node and also linked branch and leaf nodes forming branch structures terminating in the leaf nodes and leading downward away from the root node, and each node of the code tree structure may include an expression element described by the script file, and further wherein each expression element may include executable logic enabling the expression element to return a set of one or more values when queried, and to read and write to a data stream its description including all expression elements below it in the code tree structure. Further, the script file may be a hierarchical script file according to a hierarchical scripting language. Also further, the controlled element may be a robotic element, and may be, more particularly, a robotic manipulator. Further still, the control system may be a velocity controller. Still further, the control system equation may comprise a core control system equation providing values for $\dot{q}$ given by:

$$\dot{q} = \left[\frac{J}{N_J^T W}\right]^{-1} \left[\frac{V}{-\alpha N_J^T F}\right],$$

in which: V is a vector of length m indicating motion of a point on an end-effector of the robotic manipulator rigidly attached to one or more joints of the robotic manipulator; q is a vector of length n defining the pose of the robotic manipulator; $\dot{q}$ is the rate of change q with time; J is a known m×n manipulator Jacobian and is possibly a function of q; $N_J$ is an n×(n−m) two-dimensional array defined such that $JN_J=0$; α is a known scalar; W is a known two-dimensional array and is a function of q; and F is a known vector and is a function of q, and at least one or more of W, F and α are created in the memory device by the controller as part of the code tree structure. Even still further, the control system equation may also include a scaling factor β(q,V) so that the values provided by the control system are given by:

$$\dot{q} = \beta(q, V)\left[\frac{J}{N_J^T W}\right]^{-1} \left[\frac{V}{-\alpha N_J^T F}\right],$$

and the scaling factor β(q,V) may be created in the memory device by the controller as part of the code tree structure.

Also in case of the code structure being a code tree structure, the code tree structure may further comprise at least one container, and the container may contain the root node and may be implemented so as to be able to create the expression elements of the other branch and leaf nodes. Further, the container may provide access to information relating to the state of the control system. Further still, each expression element may provide an indication allowing access to the container.

Also in accord with the first aspect of the invention, the control system may further comprise a singularity avoidance element using multi-pass singularity detection.

Still also in accord with the first aspect of the invention, the control system may further comprise at least either means responsive to an exchangeable end-effector description or means responsive to an exchangeable joint type description.

Yet still also in accord with the first aspect of the invention, a creator function may be used by the controller to impart to the code structure executable logic.

In a second aspect of the invention, a method is provided by which a control system is operative to control a controlled element using a control system equation, the method characterized by: a step in which expressions or values for at least some components of the control system equation are communicated to the control system as a script file; and a step in which the control system creates, in a memory device from which coded instructions are then obtained by which the control system is operative, at run-time, a code structure representing each of the components of the control system equation for which the script file provides an expression or a value, wherein in creating the code structure, the control system imparts to the to code structure executable logic enabling the code structure to return a set of one or more values when queried.

Thus, the invention provides for a control system to be changed quickly, at run-time simply by downloading a new description of all or part of the control system, i.e. of some or all of the algorithms and functions that in combination make up the control system, using a hierarchical (object-based) scripting language such as XML in which the algorithms are represented by a special tree structure. Therefore, when it is decided that a new (or altered) control algorithm is to be used, the algorithm is implemented per the scripting language and so no compilation is needed. An autonomous agent (such as a robotic manipulator) using the new algorithm need only read the corresponding script in a new configuration provided via an input stream, i.e. any pathway by which data is input to the autonomous agent, including e.g. the internal pathway from a physical disk drive (in case the script/ data is a file on a disk), a physical network connection (such as Ethernet), or a wireless network connection (Such as 802.11 or Bluetooth). The software that resides on or in the autonomous agent interprets the script/data based on a language grammar.

The special tree structure provided by the invention supports rapid execution of complex algorithms yet is flexible enough to implement novel control algorithms without recompilation. The tree has a root node, and also has parent nodes and child nodes. Each parent node can have any number of child nodes, and each child node has one parent node. The tree relies on a generic core velocity-control algorithm that is made robust using filters that are elements in the control tree.

By organizing the control system in this fashion—i.e. so as to be updatable using a scripting language document indicating alterations to the control system based on a tree structure representation of changes to the control system—dynamic programming (tabulating the solutions to subproblems) can be used for fast execution. The invention reduces the time required to calculate control values by avoiding duplication of subproblems.

The control algorithms, tree structure, and scripting language support multiple cooperating manipulators, general exchangeable end-effector descriptions, and exchangeable joint types. The tree representation also supports exchangeable, flexible end-effector descriptions.

BRIEF DESCRIPTION OF THE DRAWINGS

The above and other objects, features and advantages of the invention will become apparent from a consideration of the subsequent detailed description presented in connection with accompanying drawings, in which:

FIG. 1B is a block diagram showing elements of a control system for a robotic manipulator, according to the invention, and in particular showing a parser for parsing an XML document indicating as a code tree structure elements of a control system equation used to provide control signals to the robotic manipulator of FIG. 1A;

FIG. 1C is a schematic representation of elementary components of a code tree structure according to the invention;

BEST MODE FOR CARRYING OUT THE INVENTION

Figure 1A:
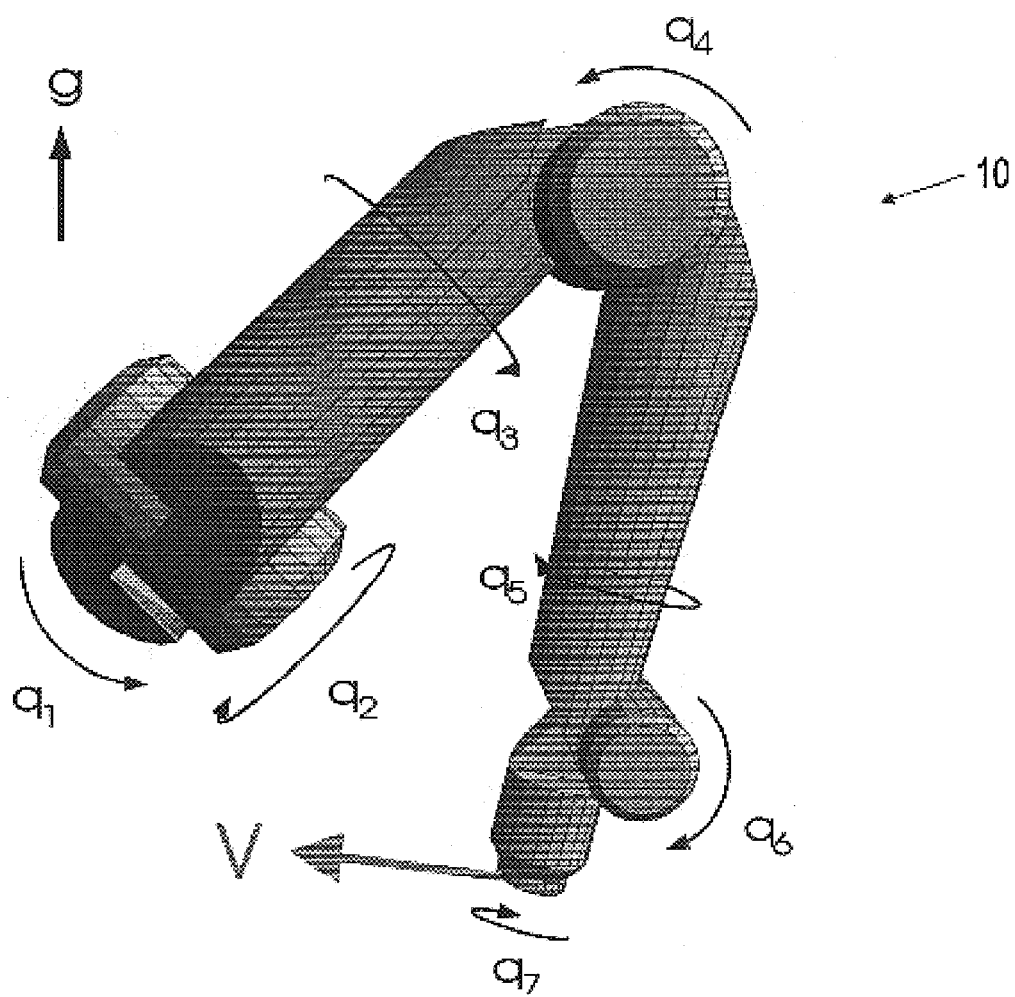
FIG. 1A is a perspective drawing of a robotic manipulator and indicating generalized coordinates defining the pose of the manipulator.

Referring now to FIGS. 1A–B, the invention is a control system 11 for a controlled element 10 made special by including in the control system 11 means for updating at least some elements 11d of the control system 11 based on a data file communicated to the control system 11 at run-time, i.e. while the control system is in operation. As a result of including within the control system 11 such means, two principal advantages accrue: decision logic (and corresponding complexity) used in determining how to modify the control system 11 so as to best adapt to changing conditions confronting the controlled element 10 is kept out of the controlled element 10, at a control center/mission control; and improvements/patches to decision logic in use by the controlled element can be made with minimum interruption to the operation of the controlled element 10. As indicated in FIGS. 1A–B, the invention is of use in particular in case of the controlled element 10 being a robotic manipulator—i.e. an arm and hand-like extremity, the hand-like extremity being called an end-effector—and the invention is here described in such a case, although the invention is of use in case of any equipment including a controlled element 10 and a corresponding control system 11.

Referring still to FIGS. 1A–B, the robotic manipulator 10 has a pose/spatial configuration fully defined by a set of generalized coordinates $q_i$ indicated here as elements of a generalized coordinate vector q. The control system 11 includes a guidance element 11h that provides desired values for the generalized coordinates and of the velocity (direction and speed of motion) V of some predetermined fixed point on the robotic manipulator/controlled element 10 (typically on the end-effector and more specifically, on a point on the end-effector rigidly attached to one or more joints of the robotic manipulator), and also includes a controller 11c that uses the desired q and V values to determine values $\dot{q}$ for the time rate of change of the generalized coordinates q, values for which corresponding signals are provided to the robotic manipulator as control signals. The $\dot{q}$ values are determined, in the preferred embodiment using the control system equation:

$$\dot{q} = \beta(q, V) \left[ \frac{J}{N_J^T W(q)} \right]^{-1} \left[ \frac{V}{-\alpha N_J^T F(q)} \right], \tag{1}$$

in which: V has length (number of components) m; q has length n; J is a known m×n manipulator Jacobian and is a function of q; $N_J$ is an n×(n−m) two-dimensional array defined such that $JN_J=0$; α is a known scalar; W is a known two-dimensional array and is a function of q; F is a known vector and is a function of q; and β(q,V) is a scaling factor β(q,V) serving as a filter, and is typically a composite function, i.e. a function of a function, and so can be described as representing a daisy chain of filters.

Now according to the invention, and still referring to FIGS. 1A–B, the controller 11c includes, in addition to non-code elements 11g and static controller code elements 11e, a code tree structure 11d created at run-time on the basis of information conveyed by a script file, i.e. a human-readable file according to one or another scripting language, such as a hierarchical scripting language such as the extensible markup language (XML). The code tree structure 11d includes executable logic and so comprises dynamic (i.e. created at run-time) controller code elements, as opposed to the static (loaded at power-on and not changed during operation) controller code elements 11e. By virtue of the executable logic, the code tree structure 11d provides values for one or more of the quantities W(q), F(q) and α and β(q,V) given the required inputs, namely e.g. q and V for the filter function β. More specifically, the code tree structure 11d comprises nodes, described below, that can be queried to return values for the one or more of the quantities W(q), F(q) and α and β(q,V). Since it is thus executable code, the code tree structure 11d is created in a memory device 11f used as main memory for holding executable instructions, or in memory (not shown) that is auxiliary to the memory device 11f (i.e. e.g. some kind of device providing extended or expanded memory). The static controller code elements 11e are loaded at power-on into the memory device 11f or its auxiliary.

As a matter of standard practice it is prudent to validate the script file defining the code tree structure 11d, and so the control system 11 includes a validator 11a to guard against errors in transmission of the script file or any incompatibilities in the script file with a schema 11b (defining e.g. acceptable values of quantities included in the script file) assumed by the control system 11 to be the validating basis for a script file defining the code tree structure/dynamic code elements 11d of the control system 11.

Preferably, the script file is a hierarchical script file, such as, e.g., as mentioned above, a script file according to XML or some other hierarchical scripting language. (XML is a structured, general way to represent data, using domain-configurable tags to represent hierarchical data, and supporting data validation, compression, and visualization.) Also, in indicating the code tree structure 11d, the script file preferably provides a tree structure representation of one or more of the quantities W(q), F(q) and α and β(q,V), but it does not include executable logic as does the code tree structure 11d, i.e. it does not include nodes that can be queried.

Referring now also to FIG. 1C, the code tree structure 1id includes a root node 12a in a container 12 and also one or more linked branch and/or leaf nodes 13 leading downward from the root node 12a. Each node includes or represents an expression element, i.e. an executable element returning a set of one or more values when queried, and able to read and write to a data stream its description including all expression elements/nodes below it in the code tree structure (11d).

Figure 2:
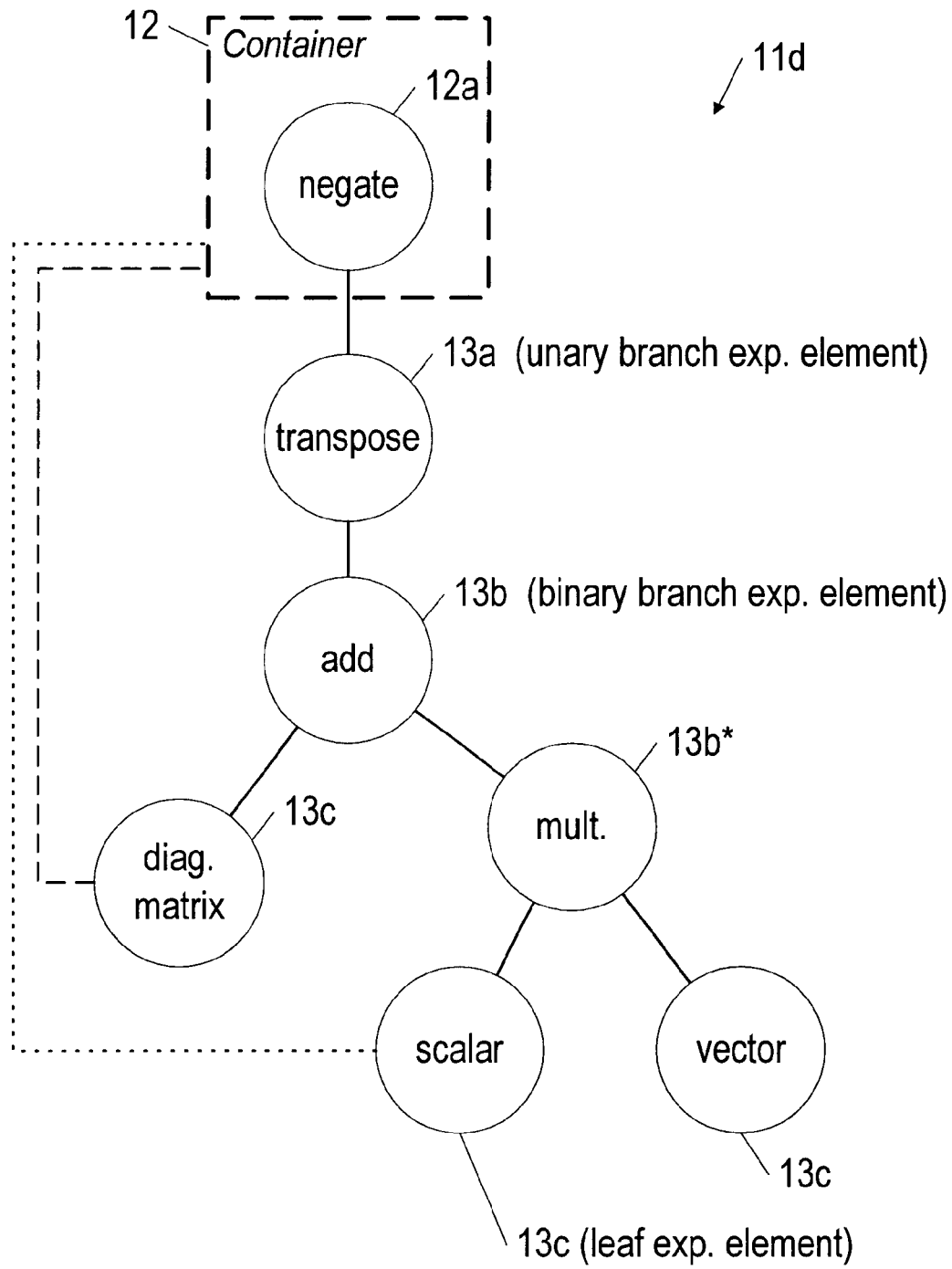
FIG. 2 is a schematic representation of a code tree structure illustrating how a code tree structure can represent an arbitrary mathematical expression, according to the invention.

Referring now to FIG. 2, an illustrative code tree structure 11d is shown as including the root node 12a and linked branch nodes 13a 13b and leaf nodes 13c, the branch and leaf nodes forming branch structures terminating in the leaf nodes and leading downward away from the root node 12a. In case of a hierarchical script file, in creating the code tree structure 11d, the controller 11c parses the hierarchical script file recursively, and uses a creator function to impart to each expression element its executable logic. The code tree structure is shown in FIG. 2 as including unary branch nodes 13a linked to a single lower (leafward) node and binary branch nodes 13b linked to two lower (leafward) nodes. A branch node according to the invention can, however, include a link to any number of lower nodes. In principle, each branch node 13a 13b, as opposed to a leaf node 13c, represents a single mathematical or logical operation, such as add, transpose, invert, multiply, negate (change the algebraic sign of), and so on. Each leaf node 13c represents, preferably, either a scalar, a vector, or a matrix, although, in principle, a leaf node can represent any kind of mathematical object (as opposed to an operation to be performed on a mathematical object), such as a tensor of any rank. Thus, the branch node 13b* farthest from the root node 12a multiplies a vector (which may be a function or a constant) by a scalar (which may also be a function or a constant, and thus, when queried and provided with any required inputs, the branch node 13b* returns a value corresponding to the product of the scalar and the vector. From one point of view, each node—whether a branch node, a leaf node, or the root node—is a code object/function/procedure that, when called or queried, returns a set of values (that may include only a single value) that can be considered to be values of a tensor of some rank (a tensor of rank zero being a scalar, a tensor of rank one being a vector, and so on), even though the set of values does not necessarily transform (under coordinate or other transformations) as a tensor should.

Figure 3:
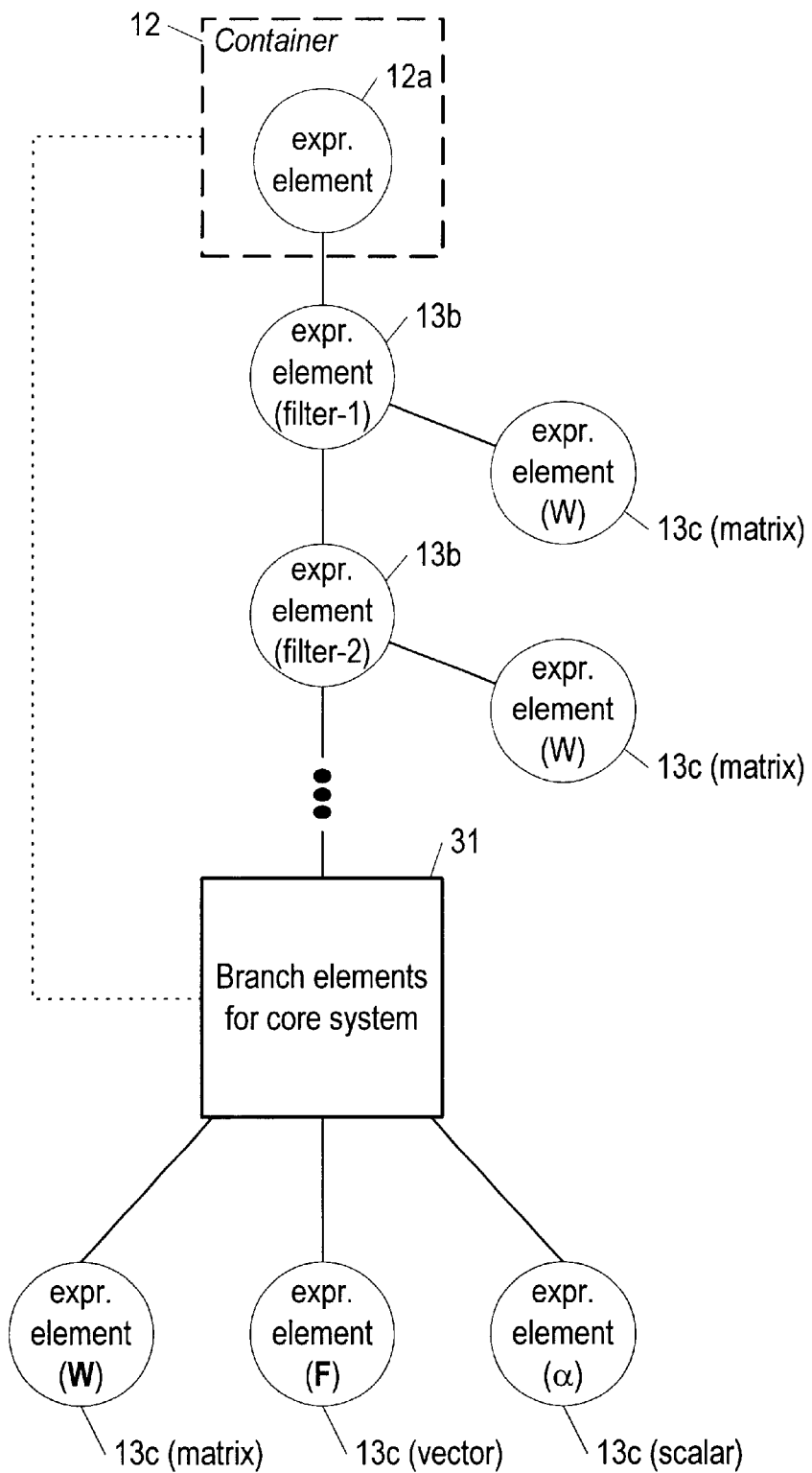
FIG. 3 is a schematic representation of a code tree structure for a control system including a core control system the output of which is provided to one of two daisy-chained filters.

Referring now to FIG. 3, the code tree structure 11d is shown schematically as including a container 12 including a root node (which is an expression element) 12a linked optionally to a chain of branch elements 13a leading to a code subtree structure 31 having leaf nodes 13c providing values for the matrix W, the vector F, and the scalar α. The code subtree structure 31 can be a single node implementing what is here called the core control system equation, namely, $$\dot{q} = \left[\frac{J}{N_J^T W(q)}\right]^{-1} \left[\frac{V}{-\alpha N_J^T F(q)}\right], \tag{2}$$

which is the control system equation eq. (1) but without the filter function β(q,V). Alternatively, the code subtree structure 31 can be a many different nodes implementing eq. (2) based on what is provided by the script file. To the extent that the script file indicates the operations to be performed on the quantities W, F, and α, and indeed on the other quantities indicated in eq. (2) (i.e. J, $N_J$, and V), the controller 11c (or whatever element of the control system creates the code tree structure 11d) can be ignorant about the control system equation, i.e. need not have preprogrammed knowledge of the core control system equation eq. (2). As is clear from the above discussion in respect to FIG. 2, the script file used by the control system 11 to create the code tree structure 11d can define essentially any mathematical expression and so, the invention enables dynamically defining not only components of a control system equation but even the entire control system equation used by the control system 11. Thus, for example, the script file could indicate as a control system equation either:

$$\dot{q} = G_1 V + (I - G_2 J)z \tag{3}$$

where z is a control parameter and the G's are generalized inverses of J, or, as another alternative:

$$G_1 = G_2 = W^{-1} J^{-1} (J W J^{-1})^{-1}. \tag{4}$$

Referring still to FIG. 3, the code tree structure 11d is shown also a series of filters, filter-1, filter-2, and so on, as branch nodes leading from the root node to the code subtree structure 31 (providing the core control system equation, eq. (2)). The series of filters is in effect a daisy chain of filters, or from another perspective, a single composite function (a function of a function that might itself be a composite function, and so on). Each filter has as an input the output of the branch node leading to the core control system code subtree structure 31 as well as a diagonal matrix W specified by the XML file (not necessarily the same as the matrix used by the core control system). In case of use of the invention for control of a robotic manipulator, one or more daisy-chained filters (expression elements) are preferably used and provide a robust extension of the core velocity-control algorithm (eq. (2)). In the case of two filters, one filter is preferably used to limit a measure of the joint rates, and the other is preferably used to limit a measure of the end-effector error.

An XML file in case of the control system 11 using the full control system equation (eq. (1)) might be as follows:

```
<controlExpressionContainer>
    <endEffectorErrorFilter>
        <stopsAtBoundaries>1</stopsAtBoundaries>
        <threshold>1</threshold>
        <unfilteredRates>
            <jointRateFilter>
                <threshold>1</threshold>
                <unfilteredRates>
                    <controlCore>
                        <matrix>
                            <massMatrix>
                            </massMatrix>
                        </matrix>
                        <scalar>
                            <scalarConstant>-1</scalarConstant>
                        </scalar>
                        <vector>
                            <jointLimitAvoidance>
                                <avoidanceZone>0.5</avoidanceZone>
                                <exponent>3</exponent>
                                <maximum>50</maximum>
                            </jointLimitAvoidance>
                        </vector>
                    </controlCore>
                </unfilteredRates>
                <weights>
                    <diagonalMatrix>
                        <columnSize>7</columnSize>
                        <diagonal size="7">
                            <element>0.1</element>
                            <element>0.1</element>
                            <element>0.1</element>
                            <element>0.1</element>
                            <element>0.1</element>
                            <element>0.1</element>
                            <element>0.1</element>
                        </diagonal>
                        <rowSize>7</rowSize>
                    </diagonalMatrix>
                </weights>
            </jointRateFilter>
        </unfilteredRates>
        <weights>
            <generalColumn>
                <column size="6">
                    <element>10</element>
                    <element>10</element>
                    <element>10</element>
                    <element>10</element>
                    <element>10</element>
                    <element>10</element>
                </column>
            </generalColumn>
        </weights>
    </endEffectorErrorFilter>
</controlExpressionContainer>
```

It implements a code tree structure in accord with that shown in FIG. 3; there are two filters and a core velocity-control node holding a matrix, a vector, and scalar. The matrix is the manipulator mass matrix, the vector is for avoiding joint limits, and the scalar makes the tradeoff between the two. As is apparent, the controller 11c, in an embodiment in which the above XML file might be used, would be preprogrammed with extensive knowledge of the control system equation eq. (1). In such an embodiment, the XML file simply in effect commands the control system 11 to use for the matrix W of the control system equation eq. (1) one particular alternative, namely the manipulator mass matrix, from among several pre-programmed alternatives. The embodiment thus takes advantage of the control system equation eq. (1) and the ability to change control systems through an implementation of eq. (1) through different choices for the matrix W, the vector F, and the scalar $\alpha$. As mentioned, other embodiments are possible in which even the very form of the control system equation is changed.

Figure 4:
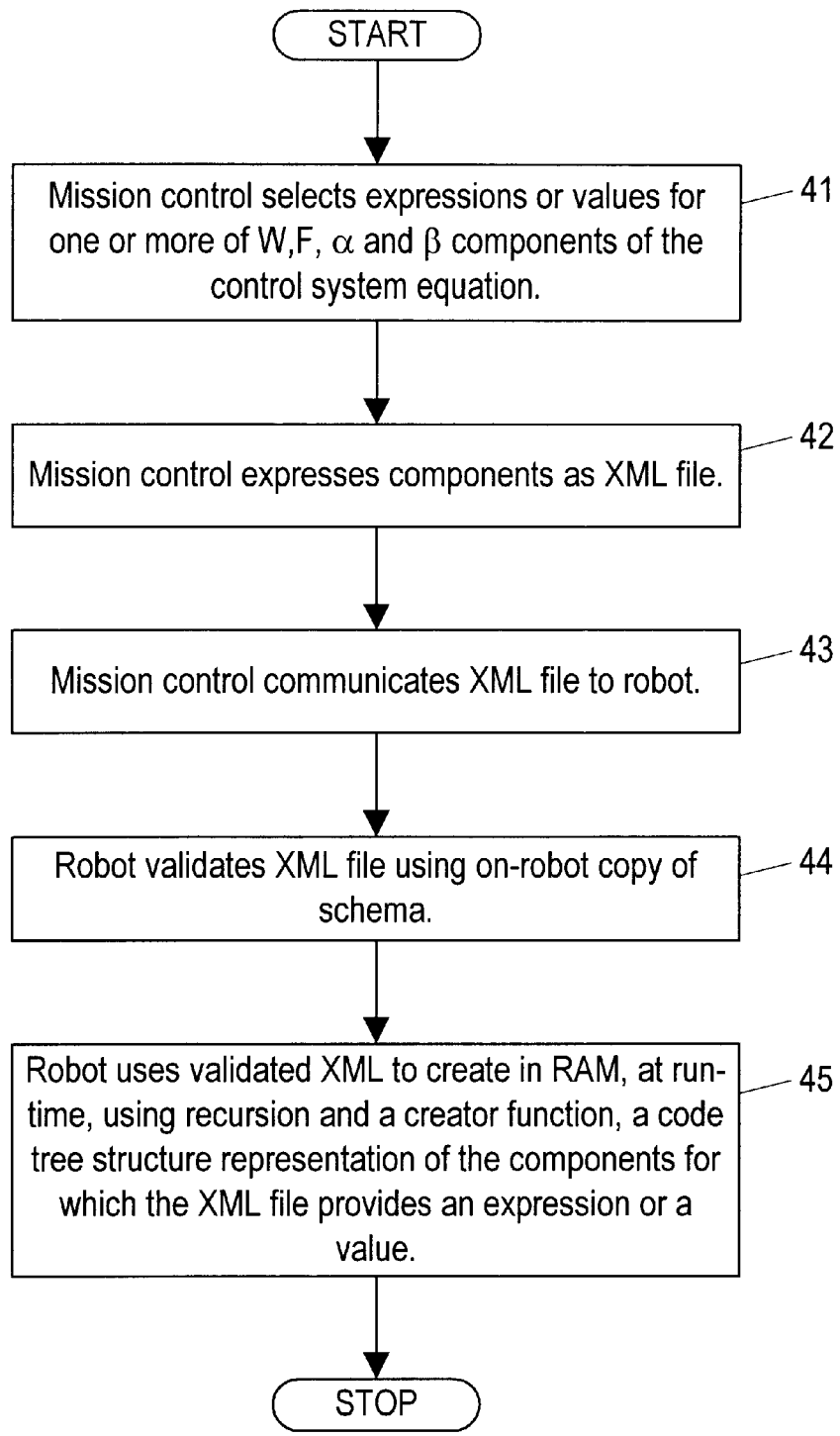
FIG. 4 is a flowchart of a method for providing control of a robotic manipulator, according to the invention.

Referring now to FIG. 4, a method according to the invention is shown as including a first step 41 in which a remote control center (i.e. distinct from the controlled element), what might be called mission control, selects expressions or values for one or more of the W, F, $\alpha$ and $\beta$ components of the control system equation. In a next step 42, mission control expresses the W, F, $\alpha$ and $\beta$ components as (preferably) an XML file. In a next step 43, mission control communicates the XML file to the controlled element (such as a robotic manipulator) 10. In a next step 44, the controlled element 10 validates the XML file using a local copy of a schema for the XML file. Finally, in a last step 445, the controlled element uses the validated XML to create in RAM, at run-time, preferably using recursion and a creator function, a code tree structure representation of the components for which the XML file provides an expression or a value.

As mentioned above, the code tree structure 11d is formed of branch elements terminated by leaf elements. In an object-oriented programming language, each type of expression element is represented using a different class. In the description according to the script file in case the script file is an XML-type of file, each expression element uses a unique string identifier of its type. The most basic expression elements are simple mathematical operations, such as multiplication and addition. All operations are supported on two-dimensional arrays in an intuitive manner. Addition is performed element-by-element and multiplication is performed as matrix multiplication. When the dimensions of quantities do not agree, the operation is performed on the maximum compatible subset. Table 1 provides exemplary operations used in the preferred embodiment.

TABLE 1

Basic branch nodes/mathematical operations to be performed on mathematical objects.

| Operation name | Meaning |
| --- | --- |
| Plus | Addition |
| Minus | Subtraction |
| Times | Multiplication |
| Element Inverse | 1/x |
| Negative | −x |
| Sine | sin (x) |
| Cosine | cos (x) |
| Transpose | $(\cdot)^T$ |

The expression elements are not limited to strict branch or leaf nodes for use in the tree structure 11d. Some elements use data that is an element-specific parameterization, i.e. the value returned by an expression element in such a case is a function both of the code tree below it and of its description in the script file. For example, a joint-rate filter may load the maximum rate directly from the script file, and apply this to joint rates that are created in the subtree below it in the tree structure 11*d*. Leaf nodes used in the preferred embodiment are indicated in Table 2.

TABLE 2

Basic leaf nodes/mathematical objects.

| Type of leaf node | Meaning |
| --- | --- |
| Constant | Constant floating-point |
| Joint Value | State Joint Value |
| Single Element Column | Column with one nonzero value |
| General Column | Column with arbitrary values |
| Single Element Matrix | Matrix with one nonzero value |
| Identity Matrix | The identity matrix |
| Diagonal Matrix | Matrix with Arbitrary diagonal |

The end-effector velocity V, which is an input to some components of the control system equation (eq. (1)), represents the motion of all the manipulator's end effectors. In the preferred embodiment of the invention, a flexible description of end effectors is used. A special class (in the terminology of object-oriented programming) holds the description of an end-effector set, which contains any number of end effectors described through kinematic constraints, such as a point or frame constraint. A point gives three degrees of constraint and a frame gives six. Each end effector is described using a string identifier for the link to which it is rigidly attached as well as an offset description. When forming kinematic entities—such as Jacobians—the end effectors are concatenated in a prescribed order.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising a controlled element (10) and a control system (11), the control system (11) using a control system equation (eq. (1)) to determine control signals (dq/dt) and the control system (11) then providing the control signals (dq/dt) to the controlled element (10), the control system (11) implemented so as to include executable elements (11*a* 11*d* 11*e* 11*h*) operative according to coded instructions, the apparatus adapted so as to load the executable elements (11*a* 11*d* 11*e* 11*h*) at power on into a memory device (11*f*) from which coded instructions are then obtained by which the control system (11) is operative, the apparatus characterized in that the control system (11) comprises:

a controller (11*c*), comprising static controller code elements (11*e*) and responsive to a script file indicating a code structure (11*d*), for providing at least some components (W,F,α,β) of the control system equation (eq. (1)), the controller (11*c*) for creating the code structure (11*d*) in the memory device (11*f*);

wherein, in providing the code structure (11*d*), the controller (11*c*) parses the script file so as to create the code structure (11*d*) in the memory device (11*f*) or in a memory device holding auxiliary memory, and imparts to the code structure (11*d*) executable logic enabling the code structure (11*d*) to return a set of one or more values when queried.

2. An apparatus as in claim 1, wherein the code structure (11*d*) is a code tree structure (11*d*) including a root node and also linked branch and leaf nodes forming branch structures terminating in the leaf nodes and leading downward away from the root node, and each node of the code tree structure includes an expression element described by the script file, and further wherein each expression element includes executable logic enabling the expression element to return a set of one or more values when queried, and to read and write to a data stream its description including all expression elements below it in the code tree structure (11*d*).

3. An apparatus as in claim 2, wherein the script file is a hierarchical script file according to a hierarchical scripting language.

4. An apparatus as in claim 2, wherein the controlled element (10) is a robotic element.

5. An apparatus as in claim 4, wherein the controlled element (10) is a robotic manipulator.

6. An apparatus as in claim 5, wherein the control system (11) is a velocity controller.

7. An apparatus as in claim 6, wherein the control system equation (eq. (1)) comprises a core control system equation providing values for q̇ given by:

$$\dot{q} = \left[\frac{J}{N_J^T W}\right]^{-1} \left[\frac{V}{-\alpha N_J^T F}\right],$$

in which: V is a vector of length m indicating motion of a point on an end-effector of the robotic manipulator rigidly attached to one or more joints of the robotic manipulator (10); q is a vector of length n defining the pose of the robotic manipulator (10); q̇ is the rate of change q with time; J is a known m×n manipulator Jacobian and is possibly a function of q; $N_J$ is an n×(n−m) two-dimensional array defined such that $JN_J=0$; α is a known scalar; W is a known two-dimensional array and is a function of q; and F is a known vector and is a function of q, and at least one or more of W, F and α are created in the memory device (11*f*) by the controller (11*c*) as part of the code tree structure (11*d*).

8. An apparatus as in claim 7, wherein the control system equation (eq. (1)) includes a scaling factor β(q,V) so that the values provided by the control system are given by:

$$\dot{q} = \beta(q, V)\left[\frac{J}{N_J^T W}\right]^{-1} \left[\frac{V}{-\alpha N_J^T F}\right],$$

and the scaling factor β(q,V) is created in the memory device (11*f*) by the controller (11*c*) as part of the code tree structure (11*d*).

9. An apparatus as in claim 2, wherein the code tree structure (11*d*) further comprises at least one container, and wherein the container contains the root node and is implemented so as to be able to create the expression elements of the other branch and leaf nodes.

10. An apparatus as in claim 9, wherein the container provides access to information relating to the state of the control system (11).

11. An apparatus as in claim 10, wherein each expression element provides an indication allowing access to the container.

12. An apparatus as in claim 1, wherein the control system (11) further comprises a singularity avoidance element using multi-pass singularity detection.

13. An apparatus as in claim 1, wherein the control system (11) further comprises at least either means responsive to an exchangeable end-effector description or means responsive to an exchangeable joint type description.

14. An apparatus as in claim 1, wherein a creator function is used by the controller (11*c*) to impart to the code structure (11*d*) executable logic.

15. A method by which a control system (11) is operative to control a controlled element (10) using a control system equation (eq. (1)), the method characterized by:

a step (53) in which expressions or values for at least some components (W,F, α,β) of the control system equation (eq. (1)) are communicated to the control system (11) as a script file; and a step (55) in which the control system (11) creates, in a memory device (11f) from which coded instructions are then obtained by which the control system (11) is operative, at run-time, a code structure (11d) representing each of the components of the control system equation (eq. (1)) for which the script file provides an expression or a value, wherein in creating the code structure (11d), the control system (11) imparts to the code structure (11d) executable logic enabling the code structure (11d) to return a set of one or more values when queried.

16. A method as in claim 15, wherein the code structure (11d) is a code tree structure (11d) including a root node and also linked branch and leaf nodes forming branch structures terminating in the leaf nodes and leading downward away from the root node, and each node of the code tree structure includes an expression element described by the script file, and further wherein each expression element includes executable logic enabling the expression element to return a set of one or more values when queried, and to read and write to a data stream its description including all expression elements below it in the code tree structure (11d).

17. A method as in claim 16, wherein the script file is a hierarchical script file according to a hierarchical scripting language.

18. A method as in claim 16, wherein the controlled element (10) is a robotic element.

19. A method as in claim 18, wherein the controlled element (10) is a robotic manipulator.

20. A method as in claim 19, wherein the control system (11) is a velocity controller.

21. A method as in claim 20, wherein the control system equation (eq. (1)) comprises a core control system equation providing values for $\dot{q}$ given by:

$$\dot{q} = \left[\frac{J}{N_J^T W}\right]^{-1} \left[\frac{V}{-\alpha N_J^T F}\right],$$

in which: V is a vector of length m indicating motion of a point on an end-effector of the robotic manipulator rigidly attached to one or more joints of the robotic manipulator (10); q is a vector of length n defining the pose of the robotic manipulator (10); $\dot{q}$ is the rate of change q with time; J is a known m×n manipulator Jacobian and is possibly a function of q; $N_J$ is an n×(n−m) two-dimensional array defined such that $JN_J=0$; α is a known scalar; W is a known two-dimensional array and is a function of q; and F is a known vector and is a function of q, and at least one or more of W, F and α are created in the memory device (11f) by the controller (11c) as part of the code tree structure (11d).

22. A method as in claim 21, wherein the control system equation (eq. (1)) includes a scaling factor β(q,V) so that the values provided by the control system are given by:

$$\dot{q} = \beta(q, V)\left[\frac{J}{N_J^T W}\right]^{-1} \left[\frac{V}{-\alpha N_J^T F}\right],$$

and the scaling factor β(q,V) is created in the memory device (11f) by the controller (11c) as part of the code tree structure (11d).

23. A method as in claim 15, wherein a creator function is used to impart to the code structure (11d) executable logic.

* * * * *

UNITED STATES PATENT AND TRADEMARK OFFICE
CERTIFICATE OF CORRECTION

PATENT NO.    : 6,757,587 B1
DATED         : June 29, 2004
INVENTOR(S)   : James English et al.

It is certified that error appears in the above-identified patent and that said Letters Patent is hereby corrected as shown below:

Column 1,
Line 23, after "existing" delete -- ". --.

Column 3,
Line 9, replace "to the to" with -- to the --.

Column 5,
Line 47, delete "lid" and substitute -- 11d --.

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,757,587 B1 | Page 1 of 1 |
| APPLICATION NO. | : 10/408056 | |
| DATED | : June 29, 2004 | |
| INVENTOR(S) | : James English et al. | |

It is certified that error appears in the above-identified patent and that said Letters Patent is hereby corrected as shown below:

On the title page, item (73), delete Assignee: "Nokia Corporation, Espoo (FI)" and substitute therefor Assignee: --Energid Technologies--.

In column 1, after the title of the invention, insert the following header and text:

--STATEMENT OF GOVERNMENT INTEREST

This invention was made with Government support under Contract Nos. NAS9-01165 and NAS9-02091, both awarded by the National Aeronautics and Space Administration (NASA). The Government has certain rights in the invention.--

In column 1, line 23, after "existing" delete ".".

Signed and Sealed this

Fifth Day of December, 2006

JON W. DUDAS
*Director of the United States Patent and Trademark Office*